Feb. 25, 1969    H. HOLT    3,429,433
STERILE PACKAGE ASSEMBLY AND PROCESS OF MAKING SAME
Filed March 28, 1967
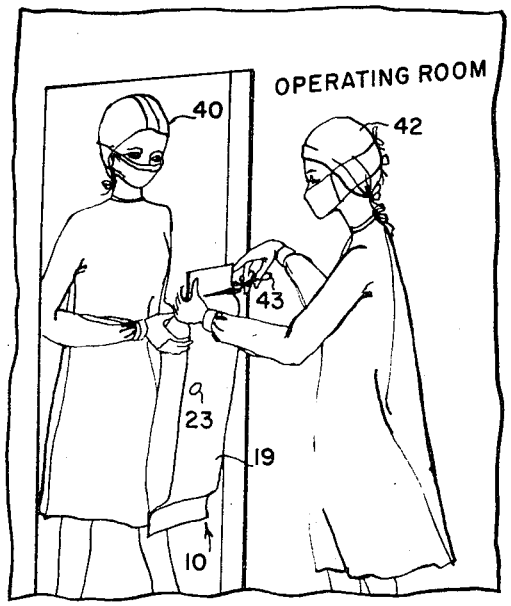
Fig. 6
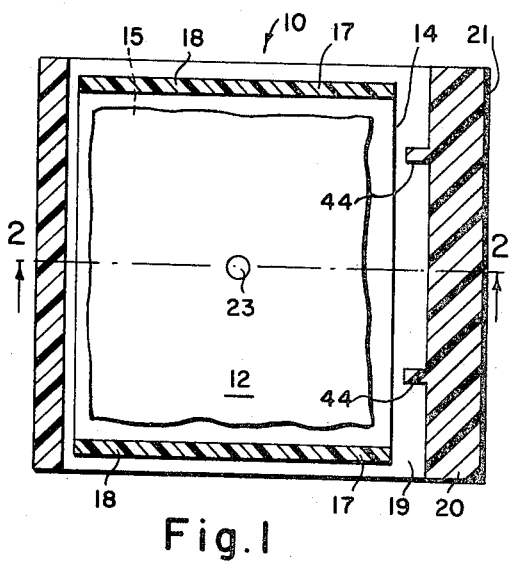
Fig. 1
Fig. 2
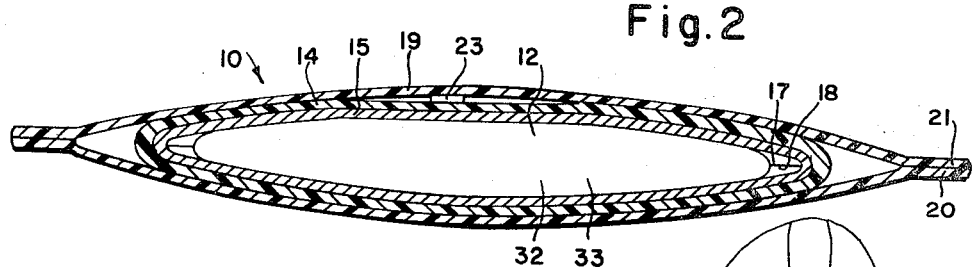
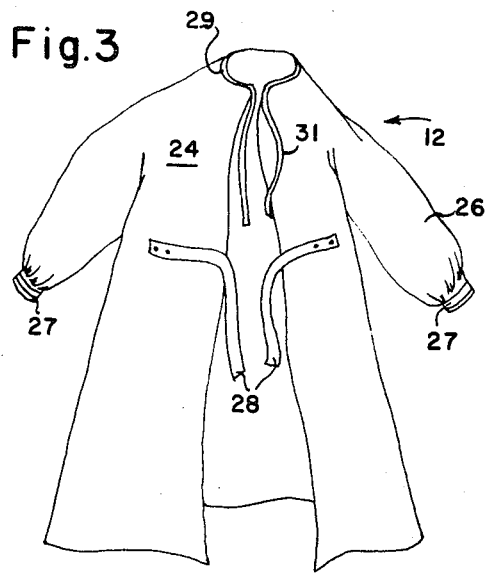
Fig. 3
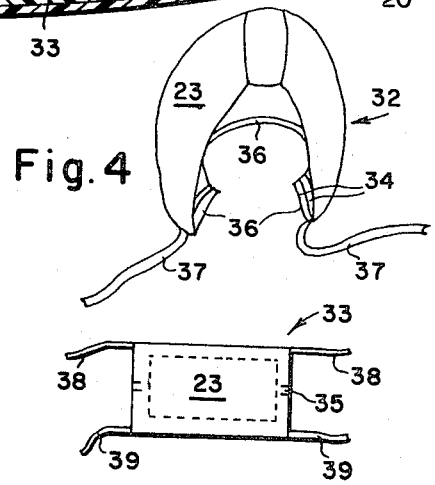
Fig. 4
Fig. 5
INVENTOR.
Herman Holt
BY
*Pearson + Pearson*
ATTORNEYS United States Patent Office 3,429,433
Patented Feb. 25, 1969

3,429,433
STERILE PACKAGE ASSEMBLY AND PROCESS
OF MAKING SAME
Herman Holt, Lawrence, Mass., assignor to Sterile Products Corporation, Boston, Mass., a corporation of Massachusetts
Filed Mar. 28, 1967, Ser. No. 626,625
U.S. Cl. 206—63.2    8 Claims
Int. Cl. A61b 19/02

ABSTRACT OF THE DISCLOSURE

A sterile package assembly including a disposable paper surgical uniform hermetically sealed in an inner envelope, the inner envelope being hermetically sealed in a transparent film outer envelope, there being a radiation sensitive indicator visible through the material of the outer envelope and the uniform, and both envelopes, being sterilized by high voltage radiation. At least one wide margin is provided on the outer envelope to facilitate handling and the inner envelope may be heat shrunk around the uniform to avoid inadvertent cutting of the inner envelope.

Background of the invention

The invention relates to a packaging means and, in particular, to a means for packaging and transporting sterile articles. The invention will find most use in the medical field but is also of value in other applications where introduction of objects is required with as little contamination as possible.

The prior art includes a number of attempts to provide a satisfactory package assembly for sterile objects. The art contains disclosures of multiple-bag packages, for example in U.S. Patent 3,202,273 to C. T. Riall. However, the successively smaller packages disclosed in the Riall patent are all of the same construction and do not provide means for facilitating the handling and opening of the outer bag without inadvertently cutting the inner bag.

Another problem which the packages suggested in the art left unsolved was a means for positively identifying whether or not the package assembly had in fact been subject to sterilization. Since no means for confirming this fact has heretofore been suggested, there was always the problem of identifying and keeping separate the sterilized and non-sterilized assemblies. This problem is especially acute at the manufacturing facility. Moreover, although disposable garments for use in medical applications have been suggested, for example in U.S. Patent 2,692,989 to G. Jelstrup, it is not believed that a garment of sufficiently good strength has yet been suggested.

Summary

Applicant solves the aforementioned problems by providing a unique packaging assembly wherein the assembly can be opened quickly without fear of cutting the inner bag and can be readily identified by a positive means indicating the packaging assembly has been subjected to sterilization.

Cutting of the inner bag is avoided by adopting one or more, preferably all, of the following novel construction methods:

(1) Construct the inner bag from a heat-shrinkable film, and cause it to shrink by applying heat thereto before packaging it in the outer bag. This avoids "loose ends" which could become cut accidentally when the outer bag is cut open.

(2) Heat seal the outer bag with a relatively wide heat seal to facilitate handling, and (3) Include an additional heat sealing of the outer bag by which heat-sealed "fingers" keep the inner bag away from any end of the outer bag that is to be cut.

A positive indication of the fact that the packaging assembly has been sterilized is provided by mounting or otherwise placing a radiation-sensitive signal tag inside the package assembly. In this application, the term "radiation sensitive tag" will be used to designate the tag before and after it has been exposed to radiation. Of course, the only requirement is that it be sensitive before said exposure. On irradiation, such a tag will change color thus providing the required visible confirmation of its setrilization.

Moreover, the surgical gown ensemble constructed of a paper fabric having a reinforcing web of synthetic yarn is believed to be a novel contribution to the art and of particular importance in applications where tear strength is important. Nylon and other such thermoplastic materials having sharp melting points are preferred for this reinforcement in order to minimize the chances of "sticky" plastic gumming up incinerator apparatus.

Description of the drawing

FIGURE 1 is a plan view of the package assembly of the invention.

FIGURE 2 is a partially schematic, section of the package assembly of the invention.

FIGURES 3 to 5 are illustrations of a surgical gown, cap, and face mask which are advantageously packaged in the assembly shown in FIGURES 2 and 3.

FIGURE 6 is an illustration of how the sterilized package of the invention is suitably introduced into a sterile operating room or other sterile area.

Description of a specific embodiment

Referring to FIGURES 1 and 2, it is seen that a package assembly 10 comprises a surgical gown 12, contained in an inner bag 14. Bag 14 is made of polyethylene film and has a liner 15 of metal foil. Heat sealed closures 17 are effected along edges 18 of bag 14.

Inner bag 14 is, in turn, contained in an outer bag 19, also constructed of polyethylene film. Bag 19 has a relatively wide heat sealed closure 20 along its edges 21 thereof. Edges 21 of outer bag 19 are arranged normal to edges 18 of inner bag 14 so that cutting of an outer edge will not endanger an inner edge. A folded edge of the inner bag 14 is thus alongside the heat sealed closure edge 20 of the outer bag 19, to avoid inadvertent cutting of the inner bag when the outer closer edge 20 is cut.

A radiation-sensitive signal tag 23 is visibly mounted on the outside of inner bag 14. This tag 23 is coated with a radiation-sensitive dye and, for example, will change color during exposure to sterilizing radiation. Such tags are commercially available; one such tag is sold by Avery Label Company under the trade designation Detex. Bags 14 and 19 are preferably flat tubes and may be of gas impervious sheet material, since they are to be sterilized by high voltage radiation.

Gown 12, seen in FIGURE 3, is conveniently constructed of a light weight, absorbent, and economically disposable fabric 24. An entirely satisfactory material is a paper-based material comprising reinforcing nylon threads and sold by Kimberly-Stevens Inc. Raglan sleeves 26 terminate in resilient cuffs 27 such as can be constructed from circular-knit cotton material or the like. Gown 12 also comprises adjustable tie tape members 28 and a collar 29. The latter is preferably constructed from disposable fabric material 24 of double thickness. A tie means 31 is used for adjusting the collar.

In addition to surgical gown 12, a protective cap 32 and a mask 33, each constructed of the same material 24 as gown 12, are also conveniently included in package assembly 10. Cap 32, seen in FIGURE 4, comprises a brow band 36 that is conveniently constructed from a plurality of layers 34 of the disposable fabric 24. Tapes 37 for tieing cap 32 in place are attached thereto.

Mask 33, seen in FIGURE 5, comprises a pair each of upper tie tapes 38 and lower tie tapes 39. The mask is formed generally, to conform to the configuration of the face. This can be done conveniently by forming a tuck 35 at each opposite side of mask 33.

Complete package assembly 10 is subjected to sterilizing radiation by ethylene oxide or radiation such as X-rays, gamma rays, neutrons or electrons. Gamma radiation is preferred. Sterilization may also be carried out by selecting a sterilizing gas to which the film is significantly pervious. In embodiments of the invention where a metal foil is used, this latter sterilizing method is not recommended.

In using package assembly 10 to advantage, a circulating nurse 40 seen in FIGURE 6, carries a package assembly 10 to the door of an operating room. At the door of the operating room, circulating nurse 40 is met by scrub nurse 42. Scrub nurse 42 inspects tag 23 to confirm the fact that assembly 10 has, in fact, been subjected to sterilizing radiation. Scissors 43 are advantageously used to cut outer bag 19 open along wide margin, or seal, 20 and inner bag 14 is withdrawn therefrom and taken into the operating room in a wholly sterile condition. Note that heat sealed fingers 44, which may be contiguous to or separate from heat seal 20 can be easily torn to facilitate removal of the inner bag. As best shown in FIGURES 1 and 6, when the assembly 10 is held vertically by the nurse 40, the inner bag 14 drops by gravity to the bottom of outer bag 19. Thus the relatively wide margin 20, with or without fingers 44, is at the top of the assembly to present a convenient finger grip for nurse 42 to hold the closure edge steady for accurate cutting.

The polymer film bags used in the construction of the package assembly can be of any of a large number of plastic films known to the art. Normally the film is about 0.5 to 10 mils in thickness. Most films, like polyethylene, are preferably from 1.0 to 3 mils in thickness. Among the other films that are convenient for use are polyvinyl chloride film, polyester films such as those sold under the trade name Mylar by E. I. du Pont de Nemours and Company, laminates of such films and the like.

Especially interesting and forming a particularly advantageous part of the instant invention is the use of shrinkable films such as the polyvinylidenechloride sold under the trade name Cryovac by W. R. Grace and Company. When such films are used to form inner bag 14, they can be dipped in hot water, or otherwise heated and thereby caused to shrink tightly about the enclosed surgical gown. In this way, the chances of the inner bag being inadvertently cut by the scrub nurse are materially reduced because there are no loose ends on the inner bag.

Another advantageous aspect of the invention is that packaging films having less permeation to gases and liquids may be used than could have been used with films which had to be signficantly permeable to gaseous or liquid sterilizing agents Various other embodiments of the invention will, of course, be obvious to those skilled in the art. For example, the surfaces of the bags can be sealed by adhesives instead of heat sealed. Moreover, when it is desired to use double packaging means for other than objects to be sterilized by radiation, the radiation tag can be omitted entirely. In such a case, all of the especially significant handling advantages of the packaging assembly of the invention would remain.

I claim:

1. A surgical uniform package adapted for permanent sterilization by high voltage radiation, said package comprising:

an outer envelope of flexible sheet material impervious to gas or liquid sterilants, said envelope being a flat tube hermetically sealed along each opposite end;

an inner envelope of transparent, flexible sheet material impervious to gas or liquid sterilants, said envelope being a flat tube hermetically sealed along each opposite end, and said inner envelope being loosely contained within said outer envelope with its said sealed edges normal to the sealed edges of the outer envelope;

a flat folded surgical uniform, including gown, cap and mask formed of disposable, reinforced paper, contained within said inner envelope;

the sheet material of said envelopes and the disposable paper material of said uniform being permeable by high voltage radiation in the range of 100,000 megarads for permanently sterilizing said uniform, the inside and outside of said inner envelope and the inside of said outer envelope.

2. A multi-enveloped packaging assembly for transporting a surgical operating uniform into a sterile operating room while avoiding contamination of said room, said assembly comprising:

a first envelope of flexible sheet material;

a flat, folded surgical uniform of disposable, reinforced, paper material contained in said first envelope;

a second envelope of transparent sheet material, the first said envelope being in the second said envelope and each said envelope being hermetically sealed;

a radiation sensitive tag outside said first envelope and visibly mounted inside said second envelope;

the sheet material of both of said envelopes and the reinforced paper material of said surgical uniform being permeable by high voltage radiation for permanently sterilizing said uniform, the inside and outside of said inner envelope and the inside of said outer envelope.

3. A packaging assembly as specified in claim 2 wherein:

said second envelope includes a heat sealed closure edge along one side thereof, and a plurality of spaced heat sealed fingers, extending normal to said closure edge toward the centre of said envelope;

said fingers maintaining said first envelope in spaced relationship from said second envelope.

4. A packaging assembly as specified in claim 2 wherein:

said first envelope of sheet material is constructed of a shrinkable thermoplastic film and said material is shrunk around the surgical uniform contained therein.

5. A packaging assembly as specified in claim 2 plus:

a liner of metal foil, enclosing said surgical uniform and lining the inside of said first envelope, said liner being impervious to gaseous sterilization but being pervious to high voltage radiation.

6. A packaging assembly as specified in claim 2 wherein:

said first envelope includes at least one folded edge, and said second envelopes includes at least one heat sealed, closure edge, the said folded edge of said first envelope being alongside the said heat sealed closure edge of said second envelope to avoid unsealing of said first envelope during the unsealing of said second envelope.

7. A packaging assembly as specified in claim 2 wherein:

said first envelope is loosely contained in said second envelope to provide along at least one side edge of said second envelope, a relatively wide margin for ease in cutting the same without damage to said first envelope.

8. A process for forming a packaging assembly suitable for transporting a sterile object into a sterile area comprising the steps of:

placing said object in an inner bag of flexible film;

heat shrinking said inner bag around said object and sealing said inner bag hermetically;

placing said heat sealed and heat shrunk inner bag in an outer bag of transparent film material;

placing a radiation sensitive tag in said outer bag where it can be observed;

sealing said outer bag, and exposing said inner and outer bag and said object to high voltage radiation.

References Cited

UNITED STATES PATENTS

| | | | |
|---|---|---|---|
| 2,542,957 | 2/1951 | Adams | 206—63.3 |
| 2,937,279 | 5/1960 | Artandi et al. | 250—83 |
| 3,202,273 | 8/1965 | Riall | 206—63.3 |
| 3,251,360 | 5/1966 | Melges | 2—114 |
| 3,279,595 | 10/1966 | Blanford | 206—63.2 |

FOREIGN PATENTS 916,538  1/1963  Great Britain.

THERON E. CONDON, *Primary Examiner.*

U.S. Cl. X.R.

250—83